(12) United States Patent
Diamant et al.

(10) Patent No.: US 10,102,072 B2
(45) Date of Patent: *Oct. 16, 2018

(54) FLEXIBLE REDUNDANT ARRAY OF INDEPENDENT DISKS (RAID) COMPUTATION DEVICE

(71) Applicant: Amazon Technologies, Inc., Seattle, WA (US)

(72) Inventors: Ron Diamant, Nesher (IL); Nafea Bshara, San Jose, CA (US); Yaniv Shapira, Bet Itzhak (IL); Guy Nakibly, Kdumim (IL)

(73) Assignee: Amazon Technologies, Inc., Seattle, WA (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/282,254

(22) Filed: Sep. 30, 2016

(65) Prior Publication Data

US 2017/0091037 A1 Mar. 30, 2017

Related U.S. Application Data

(63) Continuation of application No. 14/093,580, filed on Dec. 2, 2013, now Pat. No. 9,459,958.

(51) Int. Cl.
*G06F 11/00* (2006.01)
*G06F 11/10* (2006.01)
*G06F 11/20* (2006.01)

(52) U.S. Cl.
CPC ...... *G06F 11/1092* (2013.01); *G06F 11/1096* (2013.01); *G06F 11/2094* (2013.01)

(58) Field of Classification Search
CPC ............ G06F 11/1076; G06F 11/1092; G06F 11/1096; G06F 11/2094
See application file for complete search history.

(56) References Cited

U.S. PATENT DOCUMENTS

| 6,928,601 | B2 | 8/2005 | Katayama et al. |
| 8,433,685 | B2 | 4/2013 | Hayden et al. |
| 8,869,006 | B2 | 10/2014 | Hafner et al. |
| 9,459,958 | B2 * | 10/2016 | Diamant ............. G06F 11/1076 |
| 2004/0117718 | A1 | 6/2004 | Manasse et al. |
| 2006/0218470 | A1 | 9/2006 | Dickson et al. |

(Continued)

OTHER PUBLICATIONS

U.S. Appl. No. 14/093,580, "Non-Final Office Action", dated Dec. 2, 2015, 9 pages.

(Continued)

*Primary Examiner* — Elmira Mehrmanesh
(74) *Attorney, Agent, or Firm* — Kilpatrick Townsend & Stockton LLP (57) ABSTRACT

A method for calculating a plurality (M) of redundancy blocks for multiple (N) data blocks of a plurality (D) of words each, the method comprises: receiving the number (M) of redundancy blocks by a calculator that comprises multiple (R) calculation units; configuring the calculator according to M and R; concurrently calculating, if M equals R, by the multiple (R) calculation units of the calculator, R sets of parity vectors, each set includes a plurality (D) of parity vectors; and calculating the plurality (M) of the redundancy blocks based on the R sets of parity vectors.

20 Claims, 7 Drawing Sheets

(56) References Cited

U.S. PATENT DOCUMENTS

2007/0006019 A1    1/2007   Chien et al.
2015/0154072 A1    6/2015   Diamant et al.

OTHER PUBLICATIONS

U.S. Appl. No. 14/093,580, "Notice of Allowance", dated Jun. 7, 2016, 11 pages.
U.S. Appl. No. 14/093,580, "Supplemental Notice of Allowance", dated Sep. 1, 2016, 3 pages.

* cited by examiner

|   |   |   |   |
|---|---|---|---|
| 1 | 0 | 0 | 0 |
| 0 | 1 | 0 | 0 |
| 0 | 0 | 1 | 0 |
| 0 | 0 | 0 | 1 |
| 1 | 1 | 1 | 1 |
| 1 | 2 | 3 | 4 |

542 (rows 1-4), 544 (rows 5-6)

Input matrix 540

|   |   |   |   |
|---|---|---|---|
| 1 | 0 | 0 | 0 |
| 0 | 1 | 0 | 0 |
| 0 | 0 | 1 | 0 |
| ~~0~~ | ~~0~~ | ~~0~~ | ~~1~~ |
| ~~1~~ | ~~1~~ | ~~1~~ | ~~1~~ |
| 1 | 2 | 3 | 4 |

550

|   |   |   |   |
|---|---|---|---|
| 1 | 0 | 0 | 0 |
| 0 | 1 | 0 | 0 |
| 0 | 0 | 1 | 0 |
| 1 | 2 | 3 | 4 |

Reduced matrix 560

Inversion

| INV00 | INV01 | INV02 | INV03 |
|-------|-------|-------|-------|
| INV10 | INV11 | INV12 | INV13 |
| INV20 | INV21 | INV22 | INV23 |
| INV30 | INV31 | INV32 | INV33 |

Inverted Matrix 570

FLEXIBLE REDUNDANT ARRAY OF INDEPENDENT DISKS (RAID) COMPUTATION DEVICE

CROSS-REFERENCE TO RELATED APPLICATIONS

This application is a continuation of U.S. patent application Ser. No. 14/093,580, filed Dec. 2, 2013, now U.S. Pat. No. 9,459,958 issued on Oct. 4, 2016, entitled "Flexible Redundant Array of Independent Disks (RAID) Computation Device," which is incorporated herein by reference for all purposes.

FIELD OF THE INVENTION

The invention relates to calculation of redundancy blocks for data blocks.

BACKGROUND OF THE INVENTION

The amount of data stored in today's data-centers is rapidly growing, while reliability is becoming more important than ever before.

As a result, storage density is also growing, while disk failure rate is not improving.

This poses major scalability challenges on redundant array of independent disks (RAID) redundancy scheme, due to the increased number of disks, and increased chance for double and triple faults during long disk rebuild times.

RAID 5 calculates a single parity block for multiple data blocks.

The parity block is calculated as the XOR of all data blocks. RAID 5 provides an ability to recover from a single disk failure. The reconstruction of a failed disk requires reading all other disks. There is a relatively high risk for a second disk failure during the reconstruction of the failed disk.

RAID 6 calculates a pair of parity blocks for multiple data blocks. Parity blocks are calculated as XOR and Galois field (GF) multiplication of all data blocks.

RAID 6 provides the ability to recover from up to 2 disk failures. The reconstruction failed disks requires reading all other disks. It was believed to have relatively low risk for a third disk to fail during the reconstruction of two failed disks.

Current solutions for data protection were tailored to a specific RAID level (RDID 5, RAID 6 . . . ).

There is a growing need to provide efficient systems and methods for calculating redundancy in a flexible manner.

SUMMARY OF THE INVENTION

According to various embodiments of the invention there are provided methods and devices.

According to various embodiments of the invention there may be provided a method for calculating a plurality (M) of redundancy blocks for multiple (N) data blocks of a plurality (D) of words each, the method may include receiving the number (M) of redundancy blocks by a calculator that may include multiple (R) calculation units; configuring the calculator according to M and R; concurrently calculating, if M equals R, by the multiple (R) calculation units of the calculator, R sets of parity vectors, each set includes a plurality (D) of parity vectors; and calculating the plurality (M) of the redundancy blocks based on the R sets of parity vectors.

The method may include concurrently calculating, if M is smaller than R, by a subset of M calculation units of the calculator, M sets of parity vectors, each set includes a plurality (D) of parity vectors; and calculating the plurality (M) of the redundancy blocks based on the M sets of parity vectors.

The method may include calculating, if M equals one, by a single calculation unit of the calculator, a single set of parity vectors that includes a plurality (D) of parity vectors; and calculating a redundancy block based on the set of parity vectors.

If M exceeds R and M modulo R equals a difference X, then the method may include selecting a certain set of R rows of a Vandermonde matrix; concurrently calculating by the multiple (R) calculation units of the calculator, R sets of parity vectors, each set includes a plurality (D) of parity vectors; wherein the calculating may include processing the certain set of R rows of the Vandermonde matrix.

If there are more than R rows of the Vandermonde matrix that were not processed then the method may include selecting a new certain set of R rows of the Vandermonde matrix and concurrently calculating by the multiple (R) calculation units of the calculator, new R sets of parity vectors; wherein the calculating may include processing the new certain set of R rows of the Vandermonde matrix.

If there are X rows of the Vandermonde matrix that were not processed then the method may include selecting a further certain set of X rows of the Vandermonde matrix and concurrently calculating by X calculation units of the calculator, further X sets of parity vectors; wherein the calculating may include processing the further certain set of R rows of the Vandermonde matrix; and calculating M redundancy blocks based on all sets of the parity vectors.

Different calculation units may calculate different sets of parity vectors by multiplying different rows of a Vandermonde matrix by intermediate vectors driven from the multiple data blocks.

Different values of M may represent different redundant array of independent disks (RAID) levels.

The R may be not smaller than four.

If M exceeds R then the method may include calculating up to R parity blocks at a time until calculating the zeroeth till (M−1)'th parity block.

The buffer has a buffer size, and wherein the configuring may include determining a size of the data block in response to a ratio between the buffer size and a number of activated calculation units.

The method may include receiving multiple coefficients of the Vandermonde matrix in descriptors of the data blocks.

The adding may be executed by exclusive OR (XOR) gates.

According to various embodiments of the invention there may be provided a system for calculating a plurality (M) of redundancy blocks for multiple (N) data blocks of a plurality (D) of words each, the system may include a memory unit that is arranged to receive the number (M) of redundancy blocks; a calculator that may include multiple (R) calculation units; a controller that is arranged to configure the calculator according to M and R; wherein the multiple (R) calculation units may be arranged to concurrently calculate, if M equals R, R sets of parity vectors, each set includes a plurality (D) of parity vectors; and wherein the calculator is further arranged to calculate the plurality (M) of the redundancy blocks based on the R sets of parity vectors.

If M is smaller than R, then a subset of M calculation units of the calculator may be arranged to calculate M sets of parity vectors, each set includes a plurality (D) of parity vectors; and wherein the calculator is further arranged to calculate the plurality (M) of the redundancy blocks based on the M sets of parity vectors.

If M equals one, then a single calculation unit of the calculator is arranged to calculate a single set of parity vectors that includes a plurality (D) of parity vectors; and wherein the calculator is further arranged to calculate a redundancy block based on the set of parity vectors.

If M exceeds R and M modulo R equals a difference X, then the controller is arranged to select a certain set of R rows of a Vandermonde matrix; wherein the multiple (R) calculation units may be arranged to concurrently calculate R sets of parity vectors, each set includes a plurality (D) of parity vectors; wherein the calculating may include processing the certain set of R rows of the Vandermonde matrix.

If there are more than R rows of the Vandermonde matrix that were not processed then the controller is arranged to select a new certain set of R rows of the Vandermonde matrix and wherein the multiple (R) calculation units may be arranged to concurrently calculate new R sets of parity vectors; wherein the calculating may include processing the new certain set of R rows of the Vandermonde matrix.

If there are X rows of the Vandermonde matrix that were not processed then the controller is arranged to select a further certain set of X rows of the Vandermonde matrix and X calculation units may be arranged to calculate further X sets of parity vectors; wherein the calculating may include processing the further certain set of R rows of the Vandermonde matrix; and wherein the calculator is further arranged to calculate M redundancy blocks based on all sets of the parity vectors.

Different calculation units may be arranged to calculate different sets of parity vectors by multiplying different rows of a Vandermonde matrix by intermediate vectors driven from the multiple data blocks.

Different values of M may represent different redundant array of independent disks (RAID) levels.

According to various embodiments of the invention there may be provided a method for reconstructing multiple (N) information blocks of a plurality (D) of words each, the method may include receiving a value of N, by a calculator that may include multiple (R) calculation units; wherein the multiple information blocks are selected of a group of N+M information blocks, the group of (N+M) information blocks may include N data blocks and M parity blocks; configuring the calculator according to N and R; concurrently calculating, if N equals R, by the multiple (R) calculation units of the calculator, R sets of reconstructed data vectors, each set includes a plurality (D) of reconstructed data vectors; and generating N reconstructed data blocks based on the R sets of reconstructed data vectors.

The method may include concurrently calculating, if N is smaller than R, by a subset of N calculation units of the calculator, N sets of reconstructed data vectors, each set includes a plurality (D) of reconstructed data vectors; and calculating the multiple (N) reconstructed data blocks based on the N sets of reconstructed data vectors.

The method may include calculating, if N equals one, by a single calculation unit of the calculator, a single set of reconstructed data vectors that includes a plurality (D) of reconstructed data vectors; and calculating a reconstructed data block based on the set of reconstructed data vectors.

If N exceeds R and N modulo R equals a difference X, then the method may include selecting a certain set of R rows of an inverted matrix; the inverted matrix is calculated by inverting a reduced matrix, the reduced matrix is calculated by reducing M rows of an input matrix that may include (N+M) rows, the input matrix may include a first group of N rows and a second group of M rows, the first group of rows form a unity matrix, the second group of rows form a Vandermonde matrix; concurrently calculating by the multiple (R) calculation units of the calculator, R sets of reconstructed data vectors, each set includes a plurality (D) of reconstructed data vectors; wherein the calculating may include processing the certain set of R rows of the inverted matrix.

If there are more than R rows of the inverted matrix that were not processed then the method may include selecting a new certain set of R rows of the Inverted matrix and concurrently calculating by the multiple (R) calculation units of the calculator, new R sets of reconstructed data vectors; wherein the calculating may include processing the new certain set of R rows of the Inverted matrix.

If there are X rows of the Inverted matrix that were not processed then the method may include selecting a further certain set of X rows of the Inverted matrix and concurrently calculating by X calculation units of the calculator, further X sets of reconstructed data vectors; wherein the calculating may include processing the further certain set of R rows of the Inverted matrix; and calculating N redundancy blocks based on all sets of the reconstructed data vectors.

Different calculation units calculate different sets of reconstructed data vectors by multiplying different rows of the inverted matrix by intermediate vectors driven from the multiple reconstructed data blocks.

R may not be smaller than four.

If N exceeds R then the method may include calculating up to R reconstructed data blocks at a time until calculating the zeroeth till (N−1)'th reconstructed data block.

The buffer has a buffer size, and the configuring may include determining a size of the reconstructed data block in response to a ratio between the buffer size and a number of activated calculation units.

The method may include receiving multiple coefficients of the Inverted matrix in descriptors of the information blocks.

The adding may be executed by exclusive OR (XOR) gates.

According to various embodiments of the invention there may be provided a system reconstructing multiple (N) information blocks of a plurality (D) of words each, the system may include a memory unit adapted to receive a value of N; a calculator that may include multiple (R) calculation units; a controller that is arranged to configure the calculator in response to R and N; wherein the multiple calculation units may be arranged to concurrently calculate, if N equals R, by the multiple (R) calculation units of the calculator, R sets of reconstructed data vectors, each set includes a plurality (D) of reconstructed data vectors; and wherein the calculator is further arranged to generate N reconstructed data blocks based on the R sets of reconstructed data vectors; wherein the multiple information blocks are selected of a group of (N+M) information blocks, the group of (N+M) information blocks may include N data blocks and M parity blocks.

If N is smaller than R, then a subset of N calculation units of the calculator may be arranged to calculate N sets of reconstructed data vectors, each set includes a plurality (D) of reconstructed data vectors; and wherein the calculator is further arranged to calculate the plurality (N) of the reconstruction blocks based on the N sets of reconstructed data vectors.

If N equals one, then a single calculation unit of the calculator is arranged to calculate a single set of reconstructed data vectors that includes a plurality (D) of reconstructed data vectors; and wherein the calculator is further arranged to calculate a reconstruction block based on the set of reconstructed data vectors.

If N exceeds R and N modulo R equals a difference X, then the controller is arranged to select a certain set of R rows of an inverted matrix; the inverted matrix is calculated by inverting a reduced matrix, the reduced matrix is calculated by reducing M rows of an input matrix that may include (N+M) rows, the input matrix may include a first group of N rows and a second group of M rows, the first group of rows form a unity matrix, the second group of rows form a Vandermonde matrix; wherein the multiple (R) calculation units may be arranged to concurrently calculate R sets of reconstructed data vectors, each set includes a plurality (D) of reconstructed data vectors; wherein the calculating may include processing the certain set of R rows of the Inverted matrix.

If there are more than R rows of the Inverted matrix that were not processed then the controller is arranged to select a new certain set of R rows of the inverted matrix and wherein the multiple (R) calculation units may be arranged to concurrently calculate new R sets of reconstructed data vectors; wherein the calculating may include processing the new certain set of R rows of the inverted matrix.

If there are X rows of the inverted matrix that were not processed then the controller is arranged to select a further certain set of X rows of the inverted matrix and X calculation units may be arranged to calculate further X sets of reconstructed data vectors; wherein the calculating may include processing the further certain set of R rows of the inverted matrix; and wherein the calculator is further arranged to calculate N reconstruction blocks based on all sets of the reconstructed data vectors.

Different calculation units may be arranged to calculate different sets of reconstructed data vectors by multiplying different rows of the inverted matrix by intermediate vectors driven from the multiple reconstructed data blocks.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIG. 6 illustrates data structures according to an embodiment of the invention.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to an embodiment of the invention there is provide a flexible system that can be easily adjusted for calculating a large range of redundancy schemes, a large range of code rates (code rate reflects a relationship between data and parity of an encoded unit), for performing parity calculations with different valued coefficients, for calculating RAID calculations of different levels. The system has a parity calculator that has R calculation units that may operate in parallel and when a number (M) of parity blocks exceeds R the system can calculate all the required M parity blocks in multiple iterations. The system can offload both encoding and decoding (reconstruction), can perform calculations with configurable Galois Field generator polynomial by using configurable logarithmic and anti-logarithmic conversions.

Multiple (N) data blocks, each of d words can be received. Multiple (M) parity blocks can be calculated to these multiple data blocks. The number (M) of parity blocks is programmed and the following systems and methods are capable of calculating different numbers of parity blocks in a flexible manner.

The rows of table 1 illustrate an example of multiple (N) data blocks DB(0)–DB(N−1). Data block BD(0) includes words W(0,0)–W(0,D−1), the (N−1)'th data block DB(N−1) includes words W(N−1,0)–W(N−1,D−1). In general, assuming index n that ranges between 0 and (N−1) then the n'th data block DB(n) includes words W(n,0)–W(n,D−1) data block DB(1).

TABLE 1

| W(0,0) | W(0,1) | W(0,D − 1) |
|---|---|---|
| W(1,0) | W(1,1) | W(1,D − 1) |
| W(N − 1,0) | W(N − 1,1) | W(N − 1,D − 1) |

D intermediate vectors are defined VI(0)–VI(D−1), each intermediate vector includes a column of table 1:
VI(0)=(W(0,0), W(1,0) . . . W(N−1,0)).
VI(1)=(W(0,1), W(1,1) . . . W(N−1,1)).
VI(D−1)=(W(0,D−1), W(1,D−1) . . . W(N−1,D−1)).
In general, d ranging between zero and D−1, the d'th vector should equal:

$$VI(d)=(W(0,d),W(1,d)\ldots W(N-1,d)).$$

Figure 3:
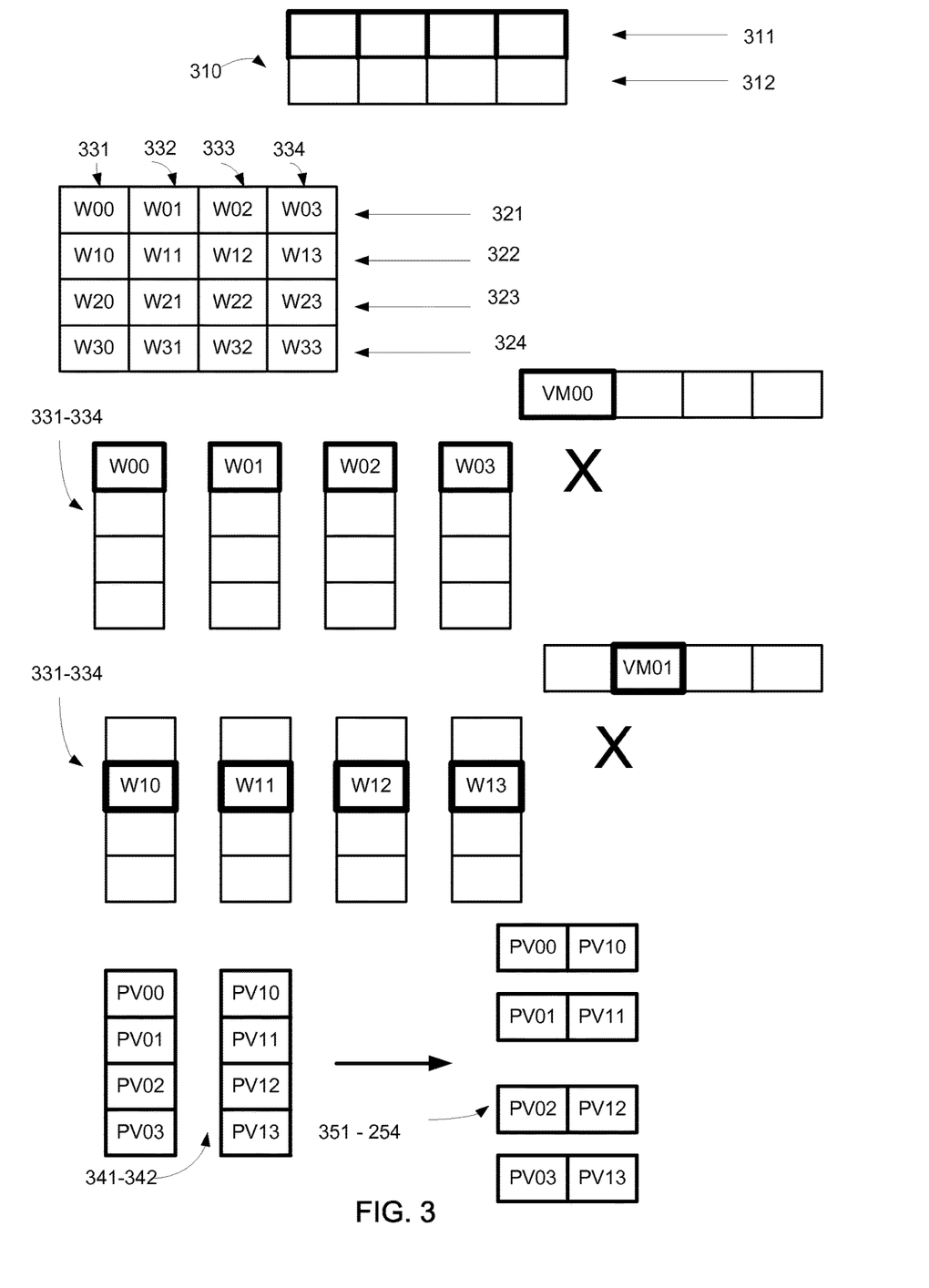
FIG. 3 illustrates data structures according to an embodiment of the invention.

FIG. 3 illustrates four data blocks 321-324, that form four intermediate vectors 331-334.

M parity blocks PB(0)–PB(M−1) are calculated. This includes calculating D parity vectors PV(0)–PV(D−1) (of M elements each) and rearranging the elements of these parity vectors to provide the M parity blocks–each parity block of D elements.

If the M parity blocks are arranged to form a parity block matrix and the D parity vectors are arranged to form a parity vector matrix than the columns of the parity vector matrix equal the rows of the parity block matrix.

Assuming index d that ranges between 0 and D−1, the d'th parity vector PV(d) is calculated by multiplying a d'th by a Vandermonde matrix (VM). The VM matrix has M rows and N columns. It includes M*N coefficients, as illustrated by table 2:

TABLE 2

| VM(0,0) = $1^0$ | VM(0,1) = $2^0$ | VM(0,N − 1) = $N^0$ |
|---|---|---|
| VM(1,0) = $1^1$ | VM(1,1) = $2^1$ | VM(1,N − 1) = $N^1$ |
| VM(M − 1,0) = $1^{M-1}$ | VM(M − 1,1) = $2^{M-1}$ | VM(M − 1,N − 1) = $N^{M-1}$ |

In general, the (m,n)'th element of VM is a coefficient that equals $n^{(m-1)}$

Each parity vector is calculated by multiplying VM by a corresponding intermediate vector VI.
Therefore:

$$PV(0)=VM*VI(0)$$

$$PV(1)=VM*VI(1)$$

$$PV(D-1)=VM*VI(D-1)$$

In general $$PV(d)=VM*VI(d).$$

Each element of each parity vector is a sum of n products of multiplications of elements of a single row of the Vandermonde matrix and the corresponding intermediate vector. These n multiplications can be executed in an iterative manner—during each iteration an intermediate result is added to a product of an element of the intermediate vector and a Vandermonde matrix coefficient.

Accordingly:

$$PV(0,0)=VM(0,0)*W(0,0)+VM(0,1)*W(1,0)+\ldots+VM(0,N-1)*W(N-1,0).$$

$$PV(1,0)=VM(1,0)*W(0,0)+VM(1,1)*W(1,0)+\ldots+VM(1,N-1)*W(N-1,1).$$

$$PV(M-1,0)=VM(M-1,0)*W(0,0)+VM(M-1,1)*W(1,0)+\ldots+VM(M-1,N-1)*W(N-1,0).$$

$$PV(0,1)=VM(0,0)*W(0,1)+VM(0,1)*W(1,1)+\ldots+VM(0,N-1)*W(N-1,1).$$

$$PV(1,1)=VM(1,0)*W(0,1)+VM(1,1)*W(1,1)+\ldots+VM(1,N-1)*W(N-1,1).$$

$$PV(M-1,1)=VM(M-1,0)*W(0,1)+VM(M-1,1)*W(1,1)+\ldots+VM(M-1,N-1)*W(N-1,1).$$

$$PV(0,D-1)=VM(0,0)*W(0,D-1)+VM(0,1)*W(1,D-1)+\ldots+VM(0,N-1)*W(N-1,D-1).$$

$$PV(1,D-1)=VM(1,0)*W(0,D-1)+VM(1,1)*W(1,D-1)+\ldots+VM(1,N-1)*W(N-1,D-1).$$

$$PV(M-1,D-1)=VM(M-1,0)*W(0,D-1)+VM(M-1,1)*W(1,D-1)+\ldots+VM(M-LN-1)*W(N-1,D-1).$$

In general, the m'th element of the d'th parity vector PV(m,d) equals VM(m,0)*W(0,d)+VM(m,1)*W(1,d)+ . . . +VM(m,N−1)*W(N−1,d).

Each element of each parity vector can be calculated by executing N calculations of the following:
a. Multiplying, by the r'th computational unit, an m'th row of the Vandermonde matrix by the r'th element of all of the intermediate vectors—by the r'th data block.
b. Adding the product to a previously calculated (that last calculated) result (for example—VM(m,1)*PI(d,1)) to provide an intermediate result.

After N repetitions the intermediate result is actually the final result—the element of the parity vector.

TABLE 3 illustrates multiple calculations that should be made for calculating the first element of each parity vector:

TABLE 3

| VM(0,0) * W(0,0) = PI(0,0) | PI(0,0) + VM(0,1) * W(1,0) = PI(1,0) | PI(0,N − 2) + VM(0,N − 1) * W(N − 1,0) = PI(N − 1,0) |
|---|---|---|
| VM(0,0) * W(0,1) = PI(0,1) | PI(1,0) + VM(0,1) * W(1,1) = PI(1,1) | PI(1,N − 2) + VM(0,N − 1) * W(N − 1,1) = PI(0,1) |
| VM(0,0) * W(0,D − 1) = PI(0,D − 1) | PI(D − 1,0) + VM(0,1) * W(1,D − 1) = PI(1,D − 1) | PI(D − 1,N − 2) + VM(0,N − 1) * W(N − 1,D − 1) = PI(0,D − 1) |

In order to calculate the entire parity vectors these should be M calculations—each time with a different row of VM. Each one of the computational units of the calculator is arranged to calculate one parity vector.

According to an embodiment of the invention the calculation of the parity vectors is executed in parallel by R calculation units. Assuming, for example, that R=M then during each calculation iteration a word of different intermediate vectors (originating from the same data block) are multiplied by different coefficients, so that during each iteration the calculations that form a row of TABLE 3 are calculated.

Assuming that R=D=4 and M=2 then:

$$Vi(0) = \begin{matrix} W(0,0) \\ W(1,0) \\ W(2,0) \\ W(3,0) \end{matrix}$$

$$Vi(1) = \begin{matrix} W(0,1) \\ W(1,1) \\ W(2,1) \\ W(3,1) \end{matrix}$$

$$Vi(2) = \begin{matrix} W(0,2) \\ W(1,2) \\ W(2,2) \\ W(3,2) \end{matrix}$$

$$Vi(3) = \begin{matrix} W(0,3) \\ W(1,3) \\ W(2,3) \\ W(3,3) \end{matrix}$$

$$VM = \begin{matrix} VM(0,0) VM(0,1) VM(0,2) VM(0,3) \\ VM(1,0) VM(1,1) VM(1,2) VM(1,3) \end{matrix} = \begin{matrix} 1111 \\ 1234 \end{matrix}$$

The following take place:
a. A first calculation unit will calculate a first parity vector. During four iterations it performs the following:
   i. Multiply the first element (1) of the first row of VM (1111) by the first element of each one of VI(0)–VI(3)—which is actually the first data block—W(0,0), W(0,1), W(0,2) and W(0,3) to provide first products PD(0,0)–PD(0,3) which are also referred to as first intermediate results PI(0,0)–PI(0,3) which are stored in a first half of a buffer.
   ii. Multiply the second element (1) of the first row of VM (1111) by the second element of each one of VI(0)–VI(3)—which is actually the second data block—W(1,0), W(1,1), W(1,2) and W(1,3) to provide second products PD(1,0)–PD(1,3), and add the first intermediate results PI(0,0)–PI(0,3) to the second products PD(1,0)–PD(1,3) to provide second intermediate results PI(1,0)–PI(1,3) which are stored in a first half of the buffer.
   iii. Multiply the third element (1) of the first row of VM (1111) by the third element of each one of VI(0)–VI(3)—which is actually the third data block—W(2,0), W(2,1), W(2,2) and W(2,3) to provide third products PD(2,0)–PD(2,3), and add the second intermediate results PI(1,0)–PI(1,3) to the third products PD(2,0)–PD(2,3) to provide third intermediate results PI(2,0)–PI(2,3) which are stored in a first half of the buffer.
   iv. Multiply the fourth element (1) of the first row of VM (1111) by the fourth element of each one of VI(0)–VI(3)—which is actually the fourth data block—W(3,0), W(3,1), W(3,2) and W(3,3) to provide fourth products PD(3,0)–PD(3,3), and add the third intermediate results PI(2,0)–PI(2,3) to the fourth products PD(3,0)–PD(3,3) to provide fourth intermediate results PI(3,0)–PI(3,3) which are stored in a first half of the buffer and form the first party vector.

b. A second calculation unit will calculate a second parity vector. During four iterations it performs the following:
   i. Multiply the first element (1) of the second row of VM (1234) by the first element of each one of VI(0)–VI(3)—which is actually the first data block—W(0,0), W(0,1), W(0,2) and W(0,3) to provide first products PD'(0,0)–PD'(0,3) which are also referred to as first intermediate results PI'(0,0)–PI'(0,3) which are stored in a second half of the buffer.
   ii. Multiply the second element (2) of the second row of VM (1234) by the second element of each one of VI(0)–VI(3)—which is actually the second data block—W(1,0), W(1,1), W(1,2) and W(1,3) to provide second products PD'(1,0)–PD'(1,3), and add the first intermediate results PI'(0,0)–PI'(0,3) to the second products PD'(1,0)–PD'(1,3) to provide second intermediate results PI'(1,0)–PI'(1,3) which are stored in a second half of the buffer.
   iii. Multiply the third element (3) of the second row of VM (1234) by the third element of each one of VI(0)–VI(3)—which is actually the third data block—W(2,0), W(2,1), W(2,2) and W(2,3) to provide third products PD'(2,0)–PD'(2,3), and add the second intermediate results PI'(1,0)–PI'(1,3) to the third products PD'(2,0)–PD'(2,3) to provide third intermediate results PI'(2,0)–PI'(2,3) which are stored in a second half of the buffer.
   iv. Multiply the fourth element (4) of the second row of VM (1234) by the fourth element of each one of VI(0)–VI(3)—which is actually the fourth data block—W(3,0), W(3,1), W(3,2) and W(3,3) to provide fourth products PD'(3,0)–PD'(3,3), and add the third intermediate results PI' (2,0)–PI'(2,3) to the fourth products PD'(3,0)–PD'(3,3) to provide fourth intermediate results PI'(3,0)–PI'(3,3) which are stored in a second half of the buffer. PI'(3,0)–PI'(3,3) form a second parity vector.
c. A first and second parity blocks will be driven from the first and second parity vectors.

FIG. 3 illustrates a two-row and a four column Vandermonde matrix 310 that includes row 311 and 312. FIG. 3 illustrates a calculation of four products obtained by calculating VM(0,0) (denoted VM00) by the first element of each intermediate vector (W00, W01, W02 and W03) during a first iteration and a calculation of four products by calculating VM(0,1) (denoted VM01) by the second element of each intermediate vector (W10, W11, W12 and W13) during a second iteration.

FIG. 3 also shows two parity vectors 341-342, each of four elements PV00-PV03 and PV10-PV13 respectively that are converted to four parity blocks 351-354 each of two elements each: (PV00, PV10), (PV01, PV11), (PV02, PV12) and (PV03, PV13).

Figure 1:
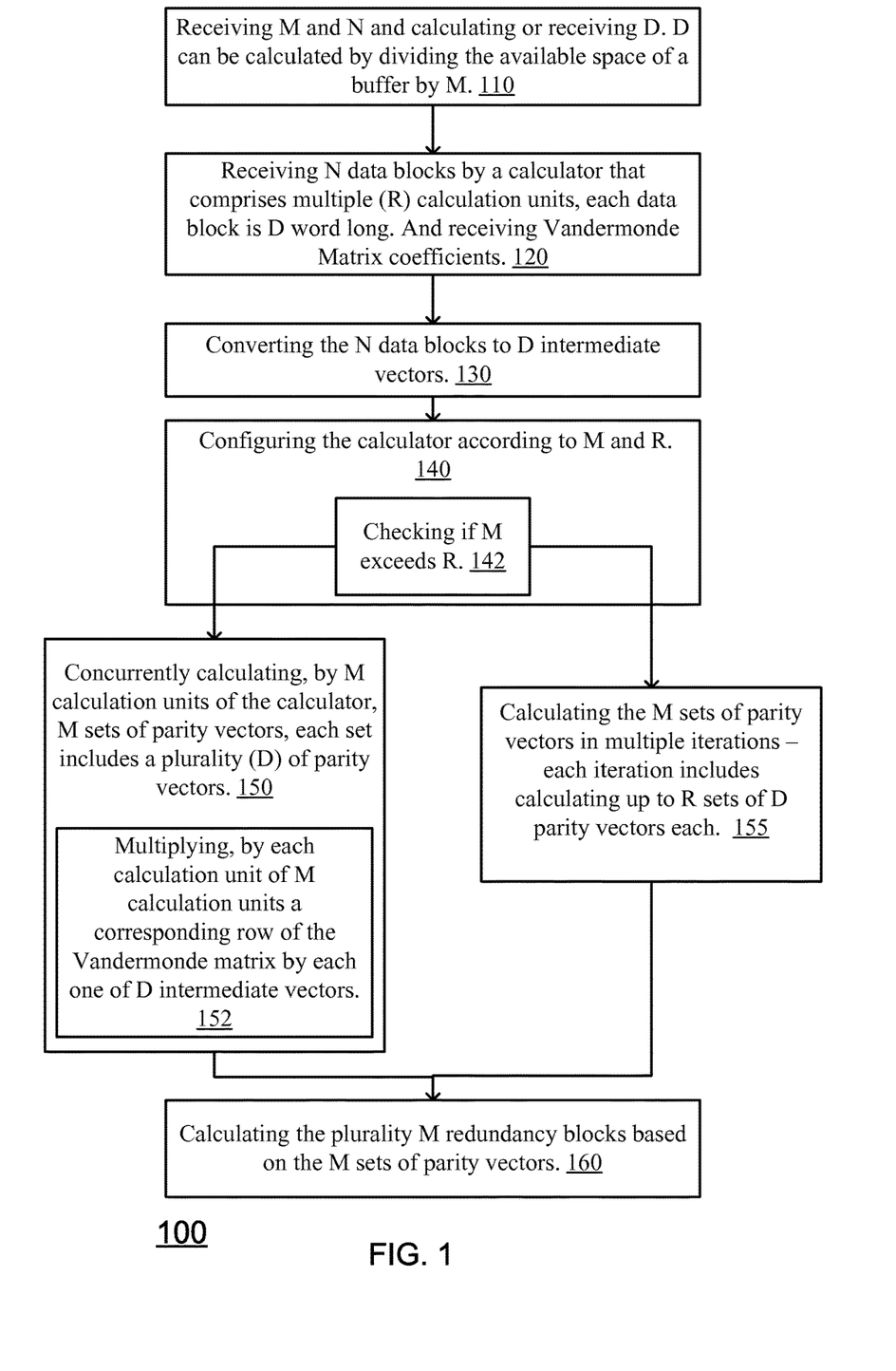
FIG. 1 illustrates a method according to an embodiment of the invention.

FIG. 1 illustrates a method 100 according to an embodiment of the invention.

Method 100 starts by stage 110 of receiving M and N and calculating or receiving D. The maximum size of D is limited by a ratio between the available space of a buffer by M.

Stage 110 is followed by stage 120 of receiving N data blocks by a calculator that comprises multiple (R) calculation units, each data block is D word long. Stage 120 may also include receiving Vandermonde Matrix coefficients. The Vandermonde Matrix coefficients can be provided within descriptors of the data blocks or otherwise provided to the calculation unit.

Stage 120 may be followed by stage 130 of converting the N data blocks to D intermediate vectors, wherein the d'th intermediate vector (index d ranges between zero and D−1) includes the d'th words of each data block.

Stage 130 may be followed by stage 140 of configuring the calculator according to M and R.

If R>M then a sub-set of M calculation units will be utilized.

If R=M all R calculation units will be utilized. If R<M then the following stages will be executed in multiple iterations, each time utilizing up to R calculation units for multiplying up to R rows of a Vandermonde matrix by intermediate vectors. If, for example M=7 and R=4 then during a first iteration four calculation units can be used to multiply four rows of the 7×N Vandermonde matrix by intermediate vectors and during another iteration three calculation units will be sued to multiply the three remaining rows of the Vandermonde matrix by intermediate vectors.

Thus, stage 140 may include stage 142 of checking if M exceeds R.

If M does not exceed R then jumping to stage 150 of concurrently calculating, by M calculation units of the calculator, M sets of parity vectors, each set includes a plurality (D) of parity vectors.

If M>R then jumping to stage 155 of calculating the M sets of parity vectors in multiple iterations—each iteration includes calculating up to R sets of D parity vectors each.

Stage 150 may include calculating, by each calculation unit and for each value of first index d that ranges between 0 and (D−1), a d'th parity vector of M elements each.

Stage 150 may be followed by stage 160 of calculating the plurality (M) of the redundancy blocks based on the R sets of parity vectors.

Stage 150 may include multiplying (152), by each calculation unit of the R calculation units a corresponding row of the Vandermonde matrix by each one of D intermediate vectors. Different calculation units multiply different rows of the Vandermonde matrix. If, for example R=M then the r'th calculation unit multiplies the r'th row of the Vandermonde matrix.

Stage 150 may be executed in an iterative manner, wherein during each iteration each calculation unit calculates a product between a Vandermonde matrix coefficient and a word of all intermediate vectors and add the product to a previously calculated intermediate result.

Accordingly, stage 150 may include performing for each value of a first index n that ranges between zero to (N−1):
a. Reading an n'th block of data and a d'th row, n'th column coefficient of a Vandermonde matrix.
b. Multiplying, in parallel, by calculation units of the calculator, the d'th row, n'th column coefficient of the Vandermonde matrix by each word of the n'th block of data to provide a plurality of current products.
c. Adding the plurality of current products to a plurality of previously calculated results to provide a plurality of intermediate results to be stored in a buffer.

Due to the parallel processing and the relationship between intermediate vectors and data blocks, during each iteration, a single data block (or a portion thereof) will be processed by each calculation unit.

Figure 2:
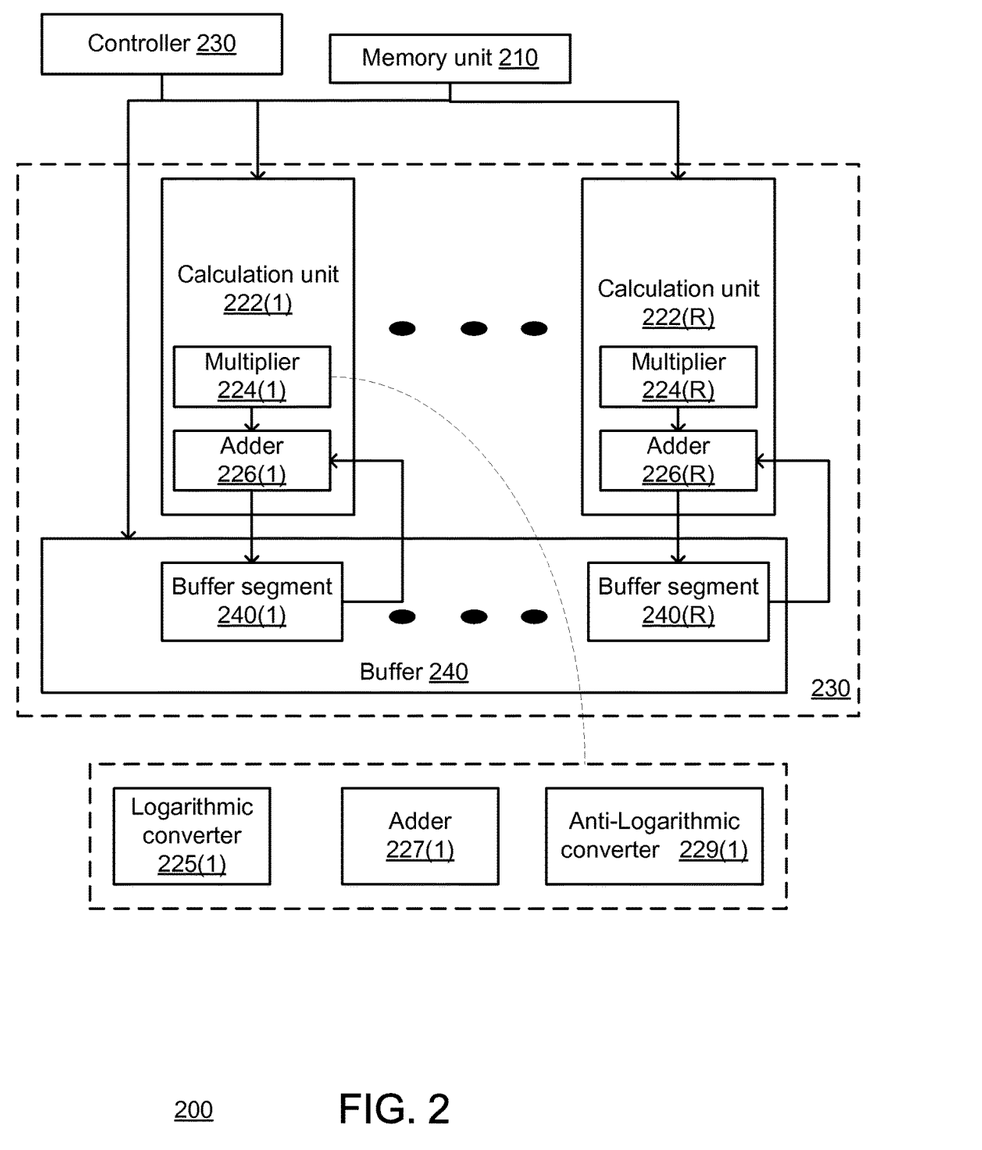
FIG. 2 illustrates a system according to an embodiment of the invention.

FIG. 2 illustrates a system 200 according to an embodiment of the invention.

Figure 4:
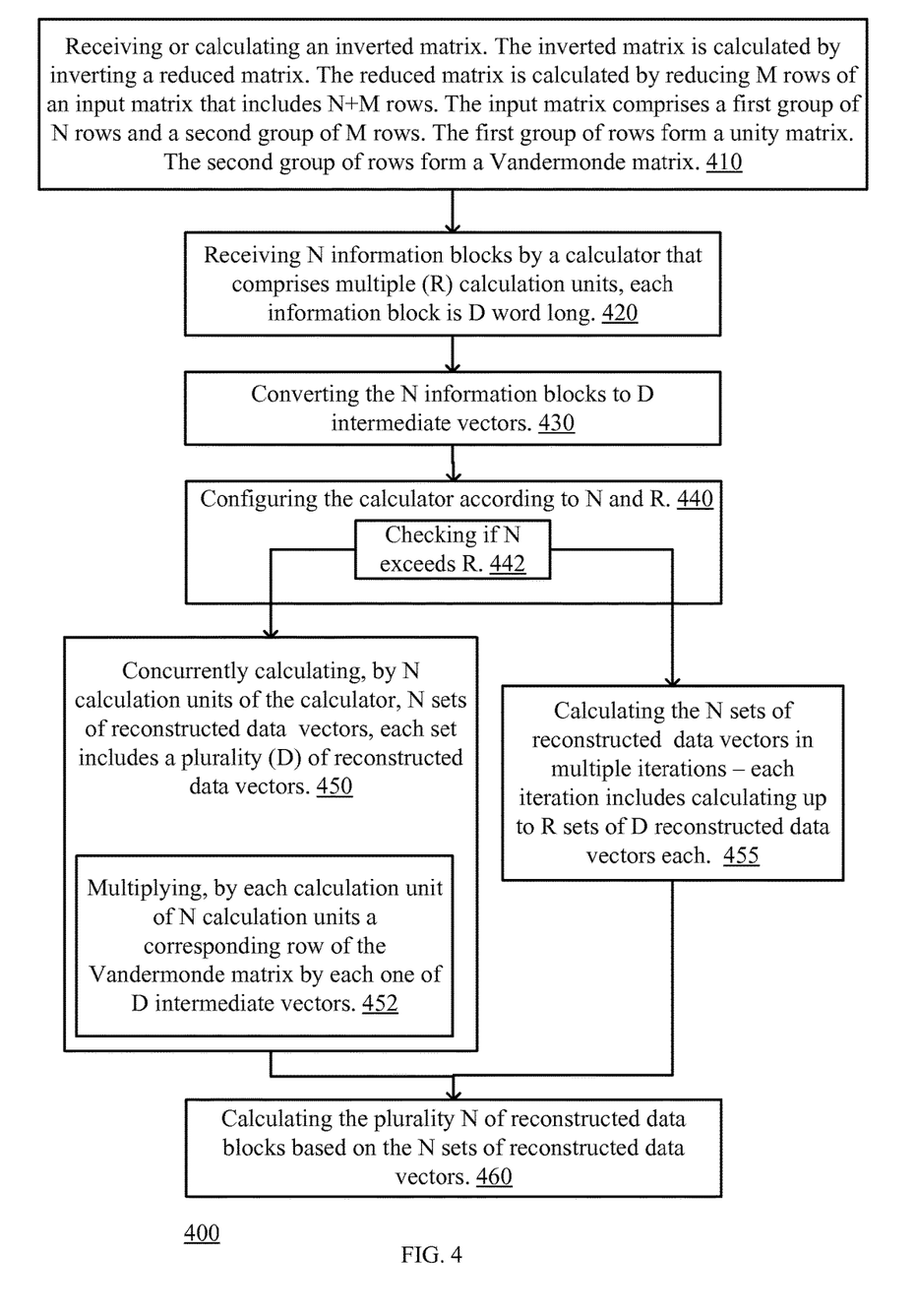
FIG. 4 illustrates a method according to an embodiment of the invention.

System 200 may be arranged to execute method 100 of FIG. 1 and method 400 of FIG. 4. For simplicity of explanation only the system will be illustrates in relation to the execution of method 100.

System 200 includes a memory unit 210 that is arranged to receive the number (M) of redundancy blocks.

System 200 also includes a data distribution unit 212 that is arranged to distribute data between various components of system 200. For example, it is arranged to send data blocks from the memory unit 210 to the calculator and to send parity vectors to the memory unit or other components.

The memory unit 210 may include a buffer although FIG. 2 illustrates the buffer 240 as being a separate entity. The buffer 240 is expected to be smaller than the memory unit 210. Data blocks and/or Vandermonde matrix coefficients can be fetched from the memory unit 210 by a direct memory access (DMA) controller.

System 200 also includes calculator 220 that includes multiple (R) calculation units 222(1)-222(R), that include multiple (R) multipliers 224(1)-224(R) and multiple (R) adders 226(1)-226(R). Each multiplier can multiply various elements (data words, Vandermonde matrix coefficients) in various manners to provide products. It can, for example, perform a logarithmic operation (Log) on the elements to be multiplied, add the outcome of the logarithmic operation to provide a sum and then perform an inverse logarithmic operation (antilog) on the sum to provide the product.

A product of each multiplier is added (by an adder) to a previously calculated intermediate result (calculated during a last iteration) to provide a new intermediate result that is sent to buffer 240.

System 200 further includes a controller 230 that is arranged to configure the calculator according to M and R.

The memory unit 210 is further arranged to receive multiple (N) data blocks of a plurality (D) of words each. The maximal length of each data block can be limited to a ratio between the size S of an available space of a buffer 240 of system 200 by the number of calculation units that are currently activated (which is M if M does not exceed R or (if M exceeds R) by R or X. In FIG. 2 it is assumed that buffer 240 is virtually partitioned to M parts 240(1)-240(M)—each part allocated to a different calculation unit.

If M equals one then the calculation of parity vectors will involve utilizing a single calculation unit. In this case the size S of a data block can equal the size of the available space of a buffer. This calculation unit calculates one set of D parity vectors.

If M exceeds one but does not exceed R then M calculation units are used. These M calculation units calculate M sets of D parity vectors.

If M equals R*Y+X (Y being a positive integer and X ranges between 1 and R−1) then exceeds R and M modulo R equals a difference X, then the system perform at least (Y+1) iterations of calculations. For example, during Y iterations each of the R calculation units may be used to calculate one set of D parity vectors and during a (Y+1)'th iteration X calculation units are used to calculate the remaining X sets of D parity vectors. The M sets of D parity vectors are used to calculate the M parity blocks.

Whenever M exceeds one different calculation units are arranged to calculate different sets of parity vectors by multiplying different rows of a Vandermonde matrix by intermediate vectors driven from the multiple data blocks.

FIG. 4 illustrates a method 400 according to an embodiment of the invention.

Method 400 starts by stage 410 of receiving or calculating an inverted matrix.

The inverted matrix is calculated by inverting a reduced matrix. The reduced matrix is calculated by reducing M rows of an input matrix that includes N+M rows. The input matrix comprises a first group of N rows and a second group of M rows.

The first group of rows forms a unity matrix. The second group of rows forms a Vandermonde matrix.

FIG. 6 illustrates input matrix 540, reduced matrix 560 and inverted matrix 570 according to various embodiments of the invention. In FIG. 6 N=4 and M=2. The first group 542 of four rows of input matrix 540 forms a 4×4 unity matrix. The second group 544 of two rows of input matrix 540 is the first two rows of a Vandermonde matrix.

It is assumed that the fourth and fifth blocks of six information blocks are corrupted and thus the reduced matrix 560 is generated by deleting the third and fourth rows of input matrix 540. The deletion is illustrated by matrix 550.

The reduced matrix 560 is inverted to provide inverted matrix 570 that includes 4×4 elements denoted INV00-INV33.

Stage 410 is followed by stage 420 of receiving N information blocks by a calculator that comprises multiple (R) calculation units, each information block is D word long.

These N information blocks are selected out of N+M information blocks. Ideally and in an errorless scenario the N+M information blocks should have been equal to N data blocks and M parity blocks written to a storage system (not shown).

Figure 5:
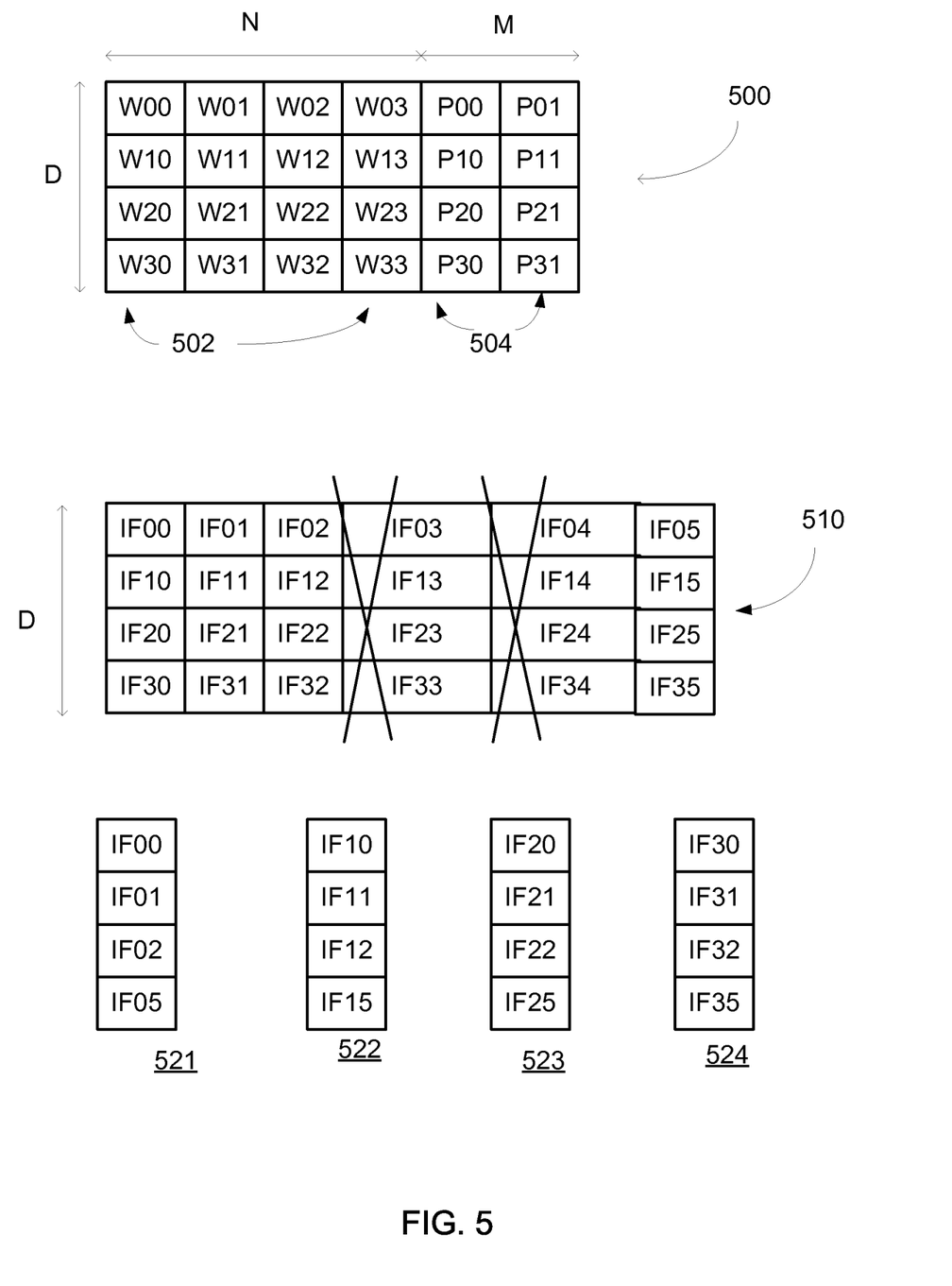
FIG. 5 illustrates data structures according to an embodiment of the invention.

Referring to the example set forth in FIG. 5, assuming that D=4, M=2 and N=4 there should have been four data blocks 502 (each data block is illustrated as a four element column of entity 500) and two parity blocks 504 (each parity block is illustrated as a four element column of entity 500). There are multiple information vectors collectively denoted 510 including six information vectors—each information vectors is a column that includes 4 elements (N=4), and there are 4×6 information entities denoted IF00-IF35.

It is assumed that the fourth and fifth information blocks are defective (the fourth and fifth columns of entity 510 are crossed X in FIG. 5) so the remaining valid information vectors include the first, second, third, and sixth information vectors.

Stage 420 may be followed by stage 430 of converting the N information blocks to D intermediate vectors, wherein the d'th intermediate vector (index d ranges between zero and D−1) includes the d'th words of each information block.

In FIG. 5 there are four intermediate vectors 521-524.

Stage 430 may be followed by stage 440 of configuring the calculator according to N and R.

If R>N then a sub-set of N calculation units will be utilized.

If R=N all R calculation units will be utilized. If R<N then the following stages will be executed in multiple iterations, each time utilizing up to R calculation units for multiplying up to R rows of an inverted matrix by intermediate vectors. If, for example N=7 and R=4 then during a first iteration four calculation units can be used to multiply four rows of the inverted matrix by intermediate vectors and during another iteration three calculation units will be issued to multiply the three remaining rows of the inverted matrix by intermediate vectors.

Thus, stage 440 may include stage 442 of checking if N exceeds R.

If N does not exceed R then jumping to stage 450 of concurrently calculating, by N calculation units of the calculator, M sets of reconstructed data vectors, each set includes a plurality (D) of reconstructed data.

If N>R then jumping to stage 455 of calculating the N sets of reconstructed data vectors in multiple iterations—each iteration includes calculating up to R sets of D reconstructed data vectors each.

Stage 450 may include calculating, by each calculation unit and for each value of first index d that ranges between 0 and (D−1), a d'th reconstructed data vector of N elements each.

Stage 450 may be followed by stage 460 of calculating the plurality (N) of the redundancy blocks based on the R sets of reconstructed data vectors.

Stage 450 may include multiplying (452), by each calculation unit of the R calculation units a corresponding row of the inverted matrix by each one of D intermediate vectors. Different calculation units multiply different rows of the inverted matrix. If, for example R=N then the r'th calculation unit multiplies the r'th row of the inverted matrix.

Stage 450 may be executed in an iterative manner, wherein during each iteration each calculation unit calculates a product between an inverted matrix coefficient and a word of all intermediate vectors and add the product to a previously calculated intermediate result.

Accordingly, stage 450 may include performing for each value of a first index n that ranges between zero to (N−1):

a. Reading an n'th block of data and a d'th row, n'th column coefficient of an inverted matrix.

b. Multiplying, in parallel, by calculation units of the calculator, the d'th row, n'th column coefficient of the inverted matrix by each word of the n'th block of data to provide a plurality of current products.

c. Adding the plurality of current products to a plurality of previously calculated results to provide a plurality of intermediate results to be stored in a buffer.

Figure 7:
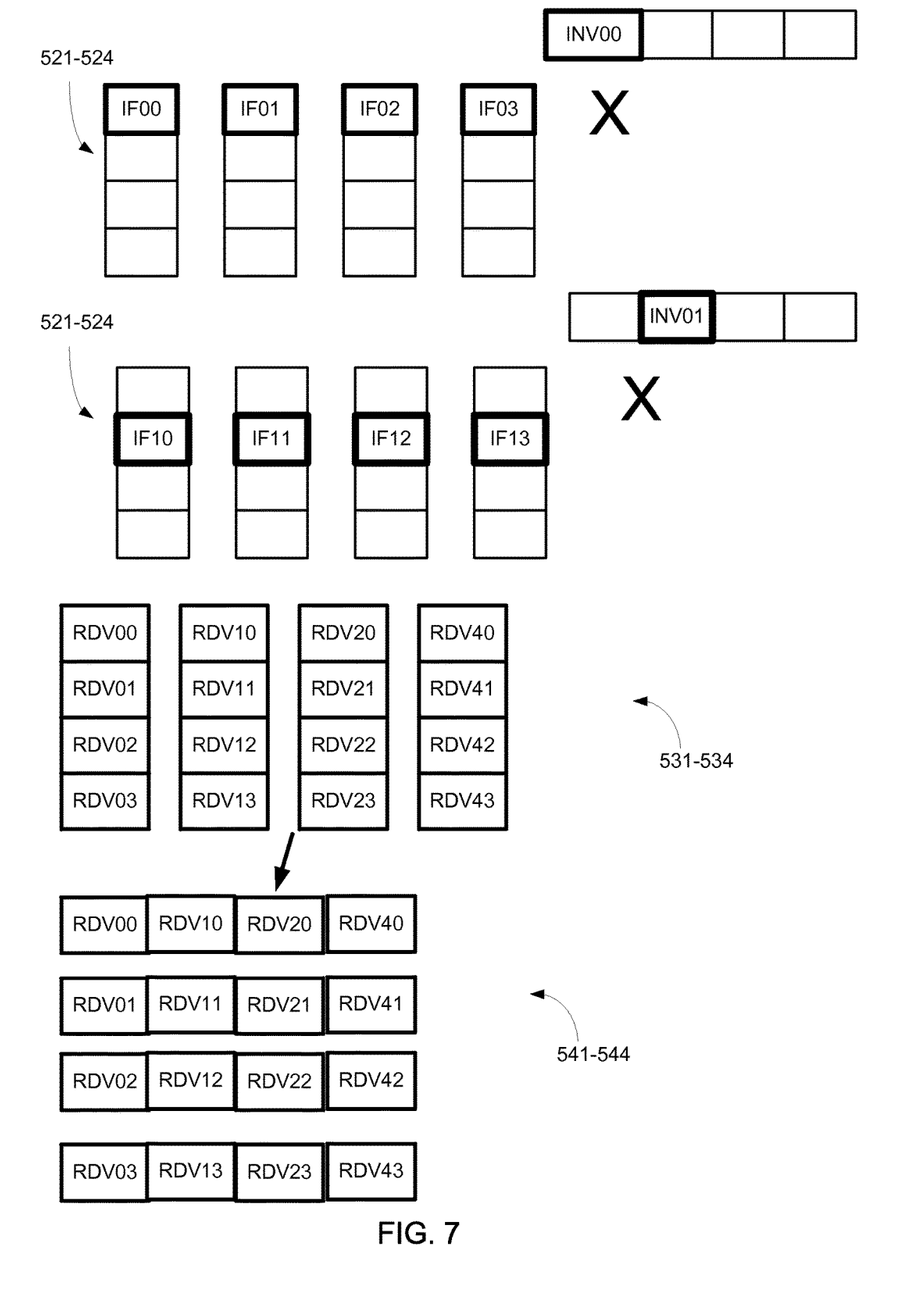
FIG. 7 illustrates data structures according to an embodiment of the invention.

FIG. 7 illustrates various data structures according to an embodiment of the invention.

FIG. 7 illustrates a first iteration during which the first element INV00 of the invented matrix is calculated by the first word (IF00, IF01, IF02, IF03) of each of the intermediate vectors 521-524.

FIG. 7 illustrates a second iteration during which the second element INV00 of the invented matrix is calculated by the second word (IF10, IF11, IF12, IF13) of each of the intermediate vectors 521-524.

FIG. 7 also shows four reconstructed data vectors 531-534 and four reconstructed data blocks 541-544. These data structures includes elements RDV00-RDV33.

Due to the parallel processing and the relationship between intermediate vectors and data blocks, during each iteration, a single data block (or a portion thereof) will be processed by each calculation unit.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, memory units or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signal.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system comprising:
 a calculator that comprises R number of calculation units and a buffer having a buffer size; and
 a controller for configuring the calculator in at least one of a redundancy calculation mode to calculate M number of one or more redundancy blocks for data blocks of D number of words each, or a reconstruction mode to reconstruct N number of one or more information blocks of D number of words each,
 wherein in the redundancy calculation mode:
  the controller is arranged to configure the calculator according to M and R by determining a size of each data block based on a ratio between the buffer size and a number of activated calculation units in the redundancy calculation mode; and
  the calculator is arranged to:
   calculate one or more sets of parity vectors by at least a subset of the R number of calculation units of the calculator, wherein each set of parity vectors includes D number of parity vectors; and
   calculate M number of one or more redundancy blocks based on the one or more sets of parity vectors, and
 wherein in the reconstruction mode:
  the controller is arranged to configure the calculator according to N and R by determining a size of each reconstructed data block in response to a ratio between the buffer size and a number of activated calculation units in the reconstruction mode, wherein the N number of one or more information blocks are selected from a group of (N+M) information blocks, the group of (N+M) information blocks comprising N data blocks and M parity blocks; and
  the calculator is arranged to:
   calculate one or more sets of reconstructed data vectors by at least a subset of the R number of calculation units of the calculator, wherein each set of reconstructed data vectors includes D number of reconstructed data vectors; and
   generate N number of reconstructed data blocks based on the one or more sets of reconstructed data vectors.

2. The system according to claim 1, wherein in the redundancy calculation mode, different calculation units calculate different sets of parity vectors by multiplying different rows of a Vandermonde matrix by intermediate vectors.

3. The system according to claim 1, wherein in the reconstruction mode, different calculation units calculate different sets of reconstructed data vectors by multiplying different rows of an inverted matrix by intermediate vectors.

4. The system according to claim 1, wherein different values of M represent different redundant array of independent disks (RAID) levels.

5. The system according to claim 1, wherein R is not smaller than four.

6. A method for calculating M number of one or more redundancy blocks for data blocks of D number of words each, the method comprising:
 receiving the data blocks by a calculator that comprises R number of calculation units and a buffer having a buffer size;
 configuring the calculator according to M and R by determining a size of each data block based on a ratio between the buffer size and a number of activated calculation units;
 calculating one or more sets of parity vectors by at least a subset of the R number of calculation units of the calculator, wherein each set of parity vectors includes D number of parity vectors; and
 calculating M number of one or more redundancy blocks based on the one or more sets of parity vectors.

7. The method according to claim 6, wherein if M equals R, the one or more sets of parity vectors includes R sets of parity vectors calculated by the R number of calculation units, and the M number of one or more redundancy blocks are calculated based on the R sets of parity vectors.

8. The method according to claim 6, wherein if M is smaller than R, the one or more sets of parity vectors includes M sets of parity vectors calculated by the M number of calculation units, and the M number of one or more redundancy blocks are calculated based on the M sets of parity vectors.

9. The method according to claim 6, wherein if M equals one, the one or more sets of parity vectors includes a single set of parity vectors calculated by a single calculation unit, and one redundancy block is calculated based on the single set of parity vectors.

10. The method according to claim 6, wherein if M exceeds R, and M modulo R equals a difference X, the step of calculating the one or more sets of parity vectors includes:
 selecting a certain set of R rows of a Vandermonde matrix;
 calculating R sets of parity vectors by the R number of calculation units by processing the certain set of R rows of the Vandermonde matrix;
 if there are more than R rows of the Vandermonde matrix that were not processed, then selecting a new certain set of R rows of the Vandermonde matrix and calculating additional R sets of parity vectors by the R number of calculation units by processing the new certain set of R rows of the Vandermonde matrix; and if there are X rows of the Vandermonde matrix that were not processed, then selecting a further certain set of X rows of the Vandermonde matrix and calculating X sets of parity vectors by X number of the calculation units of the calculator by processing the further certain set of X rows of the Vandermonde matrix.

11. The method according to claim 10, wherein different calculation units calculate different sets of parity vectors by multiplying different rows of the Vandermonde matrix by intermediate vectors.

12. The method according to claim 6, wherein different values of M represent different redundant array of independent disks (RAID) levels.

13. The method according to claim 6, wherein R is not smaller than four.

14. The method according to claim 6, further comprising receiving multiple coefficients of a Vandermonde matrix in descriptors of the data blocks.

15. A method for reconstructing N number of one or more information blocks of D number of words each, the method comprising:

receiving a value of N by a calculator that comprises R number of calculation units and a buffer having a buffer size, wherein the N number of one or more information blocks are selected from a group of (N+M) information blocks, the group of (N+M) information blocks comprising N data blocks and M parity blocks;

configuring the calculator according to N and R by determining a size of each reconstructed data block in response to a ratio between the buffer size and a number of activated calculation units;

calculating one or more sets of reconstructed data vectors by at least a subset of the R number of calculation units of the calculator, wherein each set of reconstructed data vectors includes D number of reconstructed data vectors; and generating N number of reconstructed data blocks based on the one or more sets of reconstructed data vectors.

16. The method according to claim 15, wherein if N equals R, the one or more sets of reconstructed data vectors includes R sets of reconstructed data vectors calculated by the R number of calculation units, and the N number of reconstructed data blocks are calculated based on the R sets of reconstructed data vectors.

17. The method according to claim 15, wherein if N is smaller than R, the one or more sets of reconstructed data vectors includes N sets of reconstructed data vectors calculated by the N number of calculation units, and the N number of reconstructed data blocks are calculated based on the N sets of reconstructed data vectors.

18. The method according to claim 15, wherein if N equals one, the one or more sets of reconstructed data vectors includes a single set of reconstructed data vectors calculated by a single calculation unit, and one reconstructed data block is calculated based on the single set of reconstructed data vectors.

19. The method according to claim 15, wherein if N exceeds R, and N modulo R equals a difference X, the step of calculating the one or more sets of reconstructed data vectors includes:

selecting a certain set of R rows of an inverted matrix, wherein:
the inverted matrix is calculated by inverting a reduced matrix,
the reduced matrix is calculated by reducing M rows of an input matrix that comprises (N+M) rows,
the input matrix comprises a first group of N rows and a second group of M rows,
the first group of N rows form a unity matrix, and
the second group of M rows form a Vandermonde matrix;

calculating R sets of reconstructed data vectors by the R number of calculation units by processing the certain set of R rows of the inverted matrix;

if there are more than R rows of the inverted matrix that were not processed, then selecting a new certain set of R rows of the inverted matrix and calculating additional R sets of reconstructed data vectors by the R number of calculation units by processing the new certain set of R rows of the inverted matrix; and if there are X rows of the inverted matrix that were not processed, then selecting a further certain set of X rows of the inverted matrix, and calculating X sets of reconstructed data vectors by X number of the calculation units of the calculator by processing the further certain set of X rows of the inverted matrix.

20. The method according to claim 19, wherein different calculation units calculate different sets of reconstructed data vectors by multiplying different rows of the inverted matrix by intermediate vectors.

* * * * *